Nov. 27, 1962    A. L. MEYER, JR., ET AL    3,065,866
BALE BUNCHER
Filed Nov. 9, 1960    2 Sheets-Sheet 1
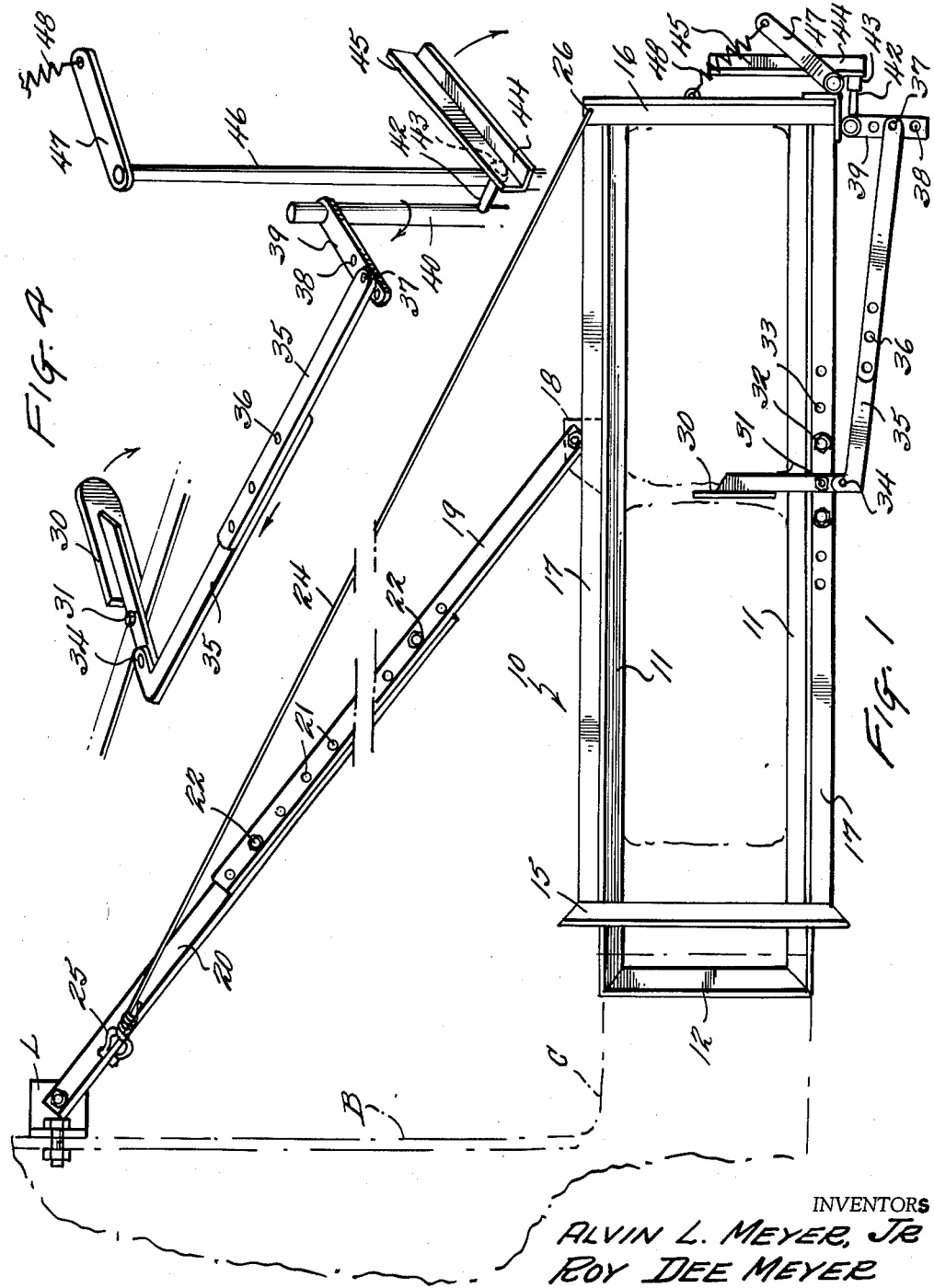
INVENTORS
ALVIN L. MEYER, JR
ROY DEE MEYER
BY
Kimmel & Crowell
ATTORNEYS

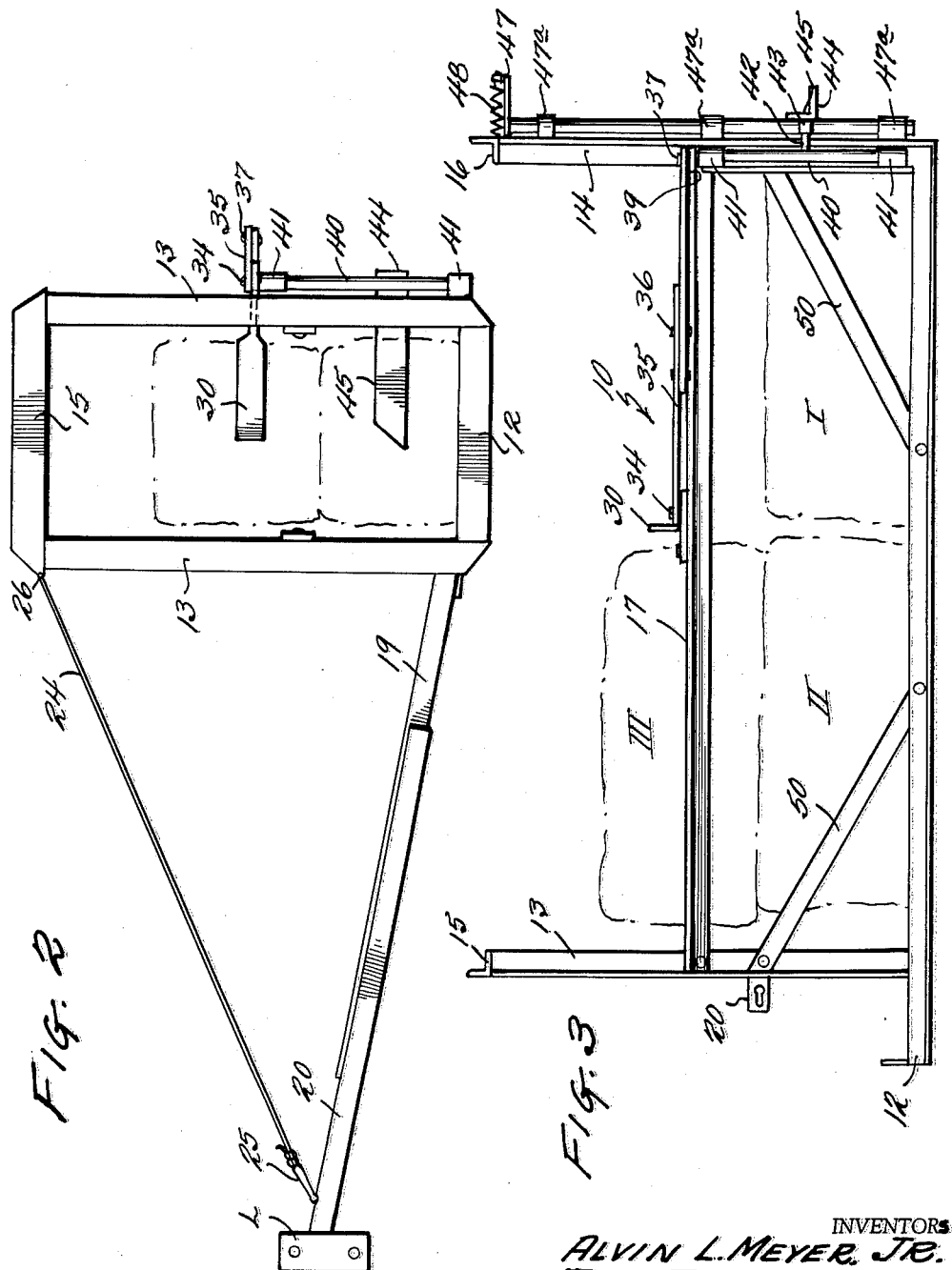

United States Patent Office 3,065,866
Patented Nov. 27, 1962

3,065,866
BALE BUNCHER
Alvin L. Meyer, Jr., and Roy Dee Meyer,
Fairfield, Mont.
Filed Nov. 9, 1960, Ser. No. 68,228
1 Claim. (Cl. 214—9)

This invention relates to a bale buncher, and has as its primary object the provision of a device for bunching bales as fed from a conventional farm baler of any desired type into groups to permit the same to be readily picked up by a bale sweep, such, for example, as that shown in our Patent No. 2,817,449, dated December 24, 1957.

A further important object of the invention is the provision of a device of this character which will bunch three bales in a bunch with two bales in end to end relation on the ground and the third bale on top of the second bale at the front of the buncher in order that they may be picked up with a bale sweep so that the doubled bales are carried at the base of the sweep. By virtue of this arrangement the operator of the sweep may pick up fifty percent more bales and one-third as many pick-ups, and thus further reduce the labor and cost of handling bales.

An additional object of the invention is the provision of a bale buncher of this character which may be readily attached to any conventional baler and so positioned as to be attached to the bale chamber, with the bale chute extending into the buncher in such position as to discharge the bales as formed thereinto.

A further object of the invention is the provision of a device of this character having means whereby the bales are automatically discharged when the three bales have been formed in the arrangement above described.

Still another object of the invention is the provision of a device of this character which is sturdy and durable in construction, reliable and efficient in operation, and relatively inexpensive to manufacture, assemble and utilize.

Still other objects reside in the combinations of elements, arrangements of parts, and features of construction, all as will be more fully pointed out hereinafter and disclosed in the accompanying drawings wherein:

FIGURE 1 is a top plan view of one form of bale buncher constructed in accordance with the instant invention shown in association with a baler, the latter being indicated schematically in dotted lines.

FIGURE 2 is an end elevational view of the front of the device of FIG. 1.

FIGURE 3 is a side elevational view of the structure of FIG. 1; and

FIGURE 4 is a perspective detail constructional view, parts thereof being broken away showing the tripping mechanism for discharging the device.

Similar reference characters refer to similar parts throughout the several views of the drawings.

Having reference now to the drawings in detail, the device of the instant invention comprises a frame generally indicated at 10, which consists of a pair of lower horizontally positioned parallel angle irons, which are adapted to rest on the ground, and are indicated at 11. At the front end of the angle irons 11 a transverse iron 12 is positioned, forming a lower U-shaped configuration. Spaced front uprights 13 extend upwardly from each of the lower members 11, at a point spaced from front member 12, while corresponding rear uprights 14 extend directly upward from the rear of members 11. Front uprights 13 are connected at their tops by a cross angle iron member 15, a while a corresponding angle iron member 16 connects the rear uprights 14. A pair of horizontally disposed intermediate angle irons 17 extend between each member 13 and its aligned rear member 14, forming a roughly rectangular framework, the height of the member 17 above the members 11 being slightly in excess of the height of a standard bale.

A lug 18 extends transversely from one of the side members 11, and has secured thereto an angle iron 19, which forms one of a pair of interconnected angle irons, the other being designated at 20. Each of the angle irons 19 and 20 is provided with a plurality of aligned apertures 21, through which bolts 22 may be selectively passed to vary the effective length of the combined members. The member 20 is pivotally attached to a lug L which in turn is secured to the axle of the baler B. The baler B is provided with a chute C, for discharge purposes, the chute C being adapted to extend between the members 13 and over the front member 12 between the members 11. A guy wire 24 extends from a clevis 25 secured to the forward portion of member 20, to a selected point 26 at the top of the adjacent upright 14, and is connected to the adjacent corner of member 16.

The arrangement is thus such that when a bale is discharged from the chute C, it falls between the members 17, and rides upon the angle irons 11, occupying the position designated by II in FIG. 3. As the device is dragged over the ground, the stubble forces the first bale to the position indicated by I, whereupon the next bale falls into the position occupied by the bale marked II. When the third successive bale is fed from the chute it occupies the position III on top of bale II, and is then in position to actuate a trip mechanism to discharge the bunched bales, the trip mechanism being effected by the pressure of the formation of a fourth bale against bale III. The trip mechanism comprises a transversely extending plate 30, which is pivotally mounted as at 31 on an adjustable plate 32 selectively mounted by bolts engaging selected holes 33 in one of angle iron members 17. The member 30 is pivotally connected as by a pivot 34 to an arm 35, which is similarly adjustable by means of bolt holes 36 to a desired length. The arm 35 is in turn pivotally connected as at 37 to a selected one of openings 38 in an arm 39, which is connected to the upper end of a post 40 which is carried in barrels or sleeves 41 carried by the adjacent rear member 14. A stop rod 42 extends from the post 40 and is provided with a head 43.

The head 43 engages the projecting end 44 of an angle iron stop member 45 which projects transversely between the rear members 14, and serves as a stop for bale I.

The member 45 is mounted on an upright rod 46 which is secured as by means of barrels or sleeves 47a to the adjacent rear upright 14, the rod 46 carrying at its upper extremity an offset lever 47. The lever 47 is connected as by means of a coil spring 48 to the center of rear top member 16.

It will thus be seen that as bale III strikes stop 30, through the linkage previously described, stop member 45 is moved out of the way, so that the forward movement of the device will permit the bale to be moved by friction with the stubble engaging on the ground outwardly, bales II and III correspondingly following to leave the bales in a neatly bunched position whereby they may be readily picked up by the bale sweep of the previously mentioned Patent No. 2,817,449.

By virtue of this arrangement the three bales I, II, and III may be picked up as a unit, by the bale sweep, thus materially reducing the time and effort required to pick up a given quantity of bales in a given time.

Suitable angularly disposed reinforcing members 50 are positioned as desired between members 13 and 11, and members 14 and 11, in order to prevent lateral movement of the bales.

From the foregoing it will now be seen that there is herein provided an improved bale buncher which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

We claim:

A bale buncher comprising a frame including an elongated U-shaped bottom member, a front pair of vertically extending upright members fixed to said U-shaped member adjacent the corners thereof, a rear pair of vertically extending upright members, each secured to one of the legs of said U-shaped members at the ends thereof, a pair of horizontally disposed elongated members, one of said elongated members having a plurality of vertical bolt holes therein each secured at the ends thereof to one of said front pair of upright members and to one of said rear pair of upright members, transverse members fixed to the upper end of said front and rear pairs of upright members, a lug fixed to one of said elongated members intermediate the ends thereof, a first angle bar having a plurality of openings therethrough pivotally secured at one end to said lug, a second angle bar coextensive with said first angle bar and having a plurality of openings therethrough adapted to be aligned with the openings in said first angle bar, means extending through aligned openings in said first and second angle bars to secure the same together, said second angle bar pivotally secured at its free end to a baler, said frame being adapted to be positioned beneath the discharge chute of the baler for the reception of bales therefrom, the length of said U-shaped bottom member being substantially equal to the length of two bales and the width of said bottom member being less than that of a bale so that a bale can ride on the side members thereof, a stop extending tranversely between said rear uprights at a height less than the height of a bale adapted to retain the first two bales fed into said frame from said chute, a trip member for releasing said stop positioned on one of said intermediate horizontal members at a height greater than the height of a bale adapted to be engaged by a third bale on top of the second of two bales previously deposited on said U-shaped bottom member to release all of said bales in a bunch, said trip member comprising a transversely extending plate, a bolt pivotally mounting said transversely extending plate, an adjustable plate selectively bolted through certain of said bolt holes in said one of said elongated members, and to which said bolt pivotally mounts said transversely extending plate, an arm pivotally connected to said transversely extending plate, a second arm having a series of bolt holes therein, a bolt passed through a selected one of said last-mentioned bolt holes securing said second arm to said first-mentioned arm, a rotatable post rotatably mounted in aligned relation with one of said rear pair of vertically extending upright members, said second arm being fixedly secured to said rotatable post, a stop rod fixed to said rotatable post and extending at substantially right angles to said second arm, an upright rod rotatably mounted adjacent said one of said rear pair of verticlly extending upright members, said stop extending between said rear pair of uprights being fixed to said upright rod and positioned to be engaged by said stop rod, an offset lever secured to the top of said upright rod and a coil spring connected between said offset lever and the transverse member fixed to the upper end of said rear pair of upright members for returning said stop to bale retaining position after being opened by said trip member, and means for securing said buncher to a baler.

References Cited in the file of this patent
UNITED STATES PATENTS 2,430,007    Evans _____ Nov. 4, 1947
2,971,318    Solem _____ Feb. 14, 1961